United States Patent
Dhanoa et al.

(10) Patent No.: US 7,768,999 B1
(45) Date of Patent: Aug. 3, 2010

(54) METHOD AND SYSTEM FOR INTERWORKING HALF DUPLEX AND FULL DUPLEX CONFERENCING

(75) Inventors: Shingara Dhanoa, Overland Park, KS (US); Ezzat S. Atieh, Olathe, KS (US); Monika Panpaliya, Leawood, KS (US)

(73) Assignee: Sprint Spectrum L.P., Overland Park, KS (US)

(*) Notice: Subject to any disclaimer, the term of this patent is extended or adjusted under 35 U.S.C. 154(b) by 1371 days.

(21) Appl. No.: 11/218,242

(22) Filed: Sep. 1, 2005

(51) Int. Cl.
*H04L 12/66* (2006.01)
(52) U.S. Cl. .............. 370/352; 370/267; 370/282; 370/493; 379/202.01; 709/204
(58) Field of Classification Search .......... 370/352, 370/276, 282, 493; 379/202.01; 709/204
See application file for complete search history.

(56) References Cited

U.S. PATENT DOCUMENTS

2003/0012149 A1* 1/2003 Maggenti et al. .......... 370/260
2003/0153343 A1* 8/2003 Crockett et al. .......... 455/519

* cited by examiner

*Primary Examiner*—Quynh H Nguyen (57) ABSTRACT

A method and system is disclosed for interworking between half-duplex and full-duplex conferencing. A half-duplex (HD) conference will be conducted through one conference server and will involve floor-control, a full-duplex (FD) conference will be conducted through another conference server, and the conference servers will exchange bearer traffic so as to cooperatively provide an HD/FD conference. When the HD conference server detects that any of the participating HD client stations holds the floor in the HD conference, the HD conference server directs the FD conference server to put the participating FD client stations in a listen-only mode with respect to the HD conference. On the other hand, when the HD conference server detects that none of the HD client stations holds the floor, the HD conference server directs the FD conference server to lift the listen-only restriction.

17 Claims, 4 Drawing Sheets

METHOD AND SYSTEM FOR INTERWORKING HALF DUPLEX AND FULL DUPLEX CONFERENCING

BACKGROUND

1. Field of the Invention

The present invention relates to network communications and, more particularly, to the management of packet-based real-time media conferences.

2. Description of Related Art

As a general matter, it is known to establish a real-time media conference over a packet-switched network between multiple user stations, each operated by a respective user. A communication server, such as a multipoint conference unit (MCU) for instance, can reside functionally in the network and can operate as a bridging or switching device between the participating stations, to support the conference session.

In practice, a participating station might initiate the conference session by sending to the communication server a session setup message that identifies the other desired participant(s). In response, the server may then seek to connect each of the designated other participants, such as by forwarding the session setup message or sending a new session setup message to each other party. Ultimately, the server would thereby establish a conference leg with each participating station, including the initiating station, and the server would then bridge together the legs so that the users at the stations can confer with each other, exchanging voice, video and/or other media in real-time via the server.

A signaling mechanism such as the well known Session Initiation Protocol (SIP) could be used to initialize the conference and more particularly to set up each conference leg. Further, digitized media could be packetized and carried between each participating station according to a mechanism such as the well known Real-time Transport Protocol (RTP), for instance, with RTP control signaling being conducted according to the well known RTP Control Protocol (RTCP). The core industry standards for SIP (Internet Engineering Task Force (IETF) Request For Comments (RFC) 3261) and RTP (IETF RFC 1889) (including RTCP) are hereby incorporated by reference.

Packet based media conferencing can be advantageously employed to provide an "instant connect" service, where a user of one station can readily initiate a real-time media conference with one or more designated target users at other stations. The initiating user may simply select a target user or group and then press an instant connect button on his or her station, and the user's station would responsively signal to a communication server to initiate a conference between the initiating user and the selected user or group. This sort of service is referred to as "instant connect" because it strives to provide a quick connection between two or more users, in contrast to telephone service where a user dials a telephone number of a party and waits for a circuit connection to be established with that party.

An example of an instant connect service is commonly known as "push-to-talk" (PTT). In a PTT system, some or all of the conference stations are likely to be wireless devices, such as cellular mobile stations, that are equipped to establish wireless packet-data connectivity and to engage in voice-over-packet (VoP) communication. Alternatively, some or all of the stations could be other sorts of devices, such as multimedia personal computers or Ethernet-telephones, that can establish packet data connectivity and engage in VoP communication through landline connections. Further, each station could be equipped with a PTT button or other mechanism that a user can engage in order to initiate a PTT session or to request the floor during an ongoing session.

In practice, a user of a PTT-equipped mobile station might select a target user or group of users from a contact list or other program menu and engage the PTT button to initiate a conference session with that user or group. In response, the mobile station may then send a session initiation message to the communication server, to set up a conference session in the manner described above for instance, and the user could begin talking with the other users. Further, a similar mechanism could be applied to establish real-time media conferences carrying video or other media as well. Thus, such a conference may more generally be referred to as a "Push-to-X" or "PTX" conference.

A conferencing system could be designed to provide either full-duplex service or half-duplex service. In a full-duplex system, a participating station would be allowed to send and receive media at the same time, so that a user of the station could both talk and listen at once. In order to accommodate full-duplex operation, a communication server would be configured to receive media from multiple stations at once and to output to each station a mixture of the media or some representative subset of the media (e.g., a strongest signal).

In a half-duplex system, on the other hand, a participating station would at any time be allowed to either send media to the server or receive media from the server, but would be precluded from sending and receiving at the same time. In order to accommodate half-duplex operation, a communication server would be configured to apply a floor-control process, according to which the server allows only one station to have the floor at once. Only the station with the floor would be allowed to send media to the server for transmission in turn to each other participating station.

In a typical floor-control process, a participant must request permission to "speak" (i.e., to send voice or other media) by sending a "floor-request" message to the server. The server then replies with a message that either grants or denies the floor. Once the server grants the floor to a participant, the server blocks all other participants from speaking (by denying all floor requests) until the speaker sends a "floor-relinquish" message to the server and the server acknowledges, or until a floor timer expires. Upon relinquishment of the floor, the server would then send a "floor-relinquished" message to all participants and the participants would acknowledge. Only after this entire sequence has been completed will any other participant be allowed to speak.

Half-duplex operation is particularly advantageous when user stations communicate over wireless links or other links with limited bandwidth. Consequently, most PTT sessions operate in a half-duplex mode, with the PTT server being configured to control the floor.

On the other hand, full-duplex operation more closely simulates in-person communication, where people can talk and listen to each other at the same time. Thus, most other conference servers operate in a full-duplex mode, to provide users with a more natural, unrestricted communication environment.

SUMMARY

The present invention stems from a realization that, at times, it may be desirable to establish a conference involving both half-duplex (HD) communication and full-duplex (FD) communication. More particularly, it may be desirable to establish a conference that ties together (i) one or more parties operating in an HD communication mode via an HD conference server (e.g., a PTT server) with (ii) one or more parties operating in an FD communication mode via a more general FD conference server.

As a general matter, one way to establish communication between parties communicating via one conference server and parties communicating via another conference server is to establish a communication link between the two conference servers and have the conference servers exchange conference bearer traffic with each other. Thus, when one conference server receives bearer traffic from its served parties, it would send the bearer traffic to the other conference server, and the other conference server would in turn send the bearer traffic to its served parties, and vice versa.

Unfortunately, however, this general arrangement will not work well when one of the conference servers is serving parties in an HD mode and the other conference server is serving parties in an FD mode. By definition, the conference server serving parties in the HD mode will apply floor control, allowing just one client station at a time to have the floor. Yet the conference server serving parties in the FD mode would not apply floor control but would rather allow the FD client stations to communicate more freely. As a result, while one of the HD client stations has the floor in the HD conference, the FD conference server may still transmit bearer traffic from the FD client stations to the HD server, thereby creating a floor control conflict for the HD conference server.

The present invention provides a method and system to help overcome this problem, by interworking more seamlessly between at least one HD conference and at least one FD conference. In accordance with an exemplary embodiment of the invention, special control signaling will be provided between an HD conference server and an FD conference server so as to harmonize interaction between the servers.

More particularly, whenever the HD conference enters a state where one of the HD client stations holds the floor in the HD conference, the HD conference server will send a control signal to the FD conference server that will direct the FD conference server to put the FD client stations in a listen-only mode with respect to the HD conference. To do so, the FD conference server may cease transmitting any bearer traffic that it receives from the FD client stations to the HD conference server. In addition, the FD conference server may optionally direct the FD client stations to disable bearer traffic transmission. Further, the FD conference server may transmit an alert signal (e.g., an in-band tone) to the FD client stations to inform each FD user of the switch to listen-only mode.

With the FD client stations in the listen-only mode with respect to the HD conference, bearer traffic of the HD conference will flow only uni-directionally from the HD conference server to the FD conference server for transmission in turn to the FD client stations. Preferably, no bearer traffic of the HD conference server will flow from the FD conference server to the HD conference server, thus eliminating the floor control conflict for the HD conference server.

On the other hand, whenever the HD conference enters a state where none of the HD client stations holds the floor, the HD conference server will send a control signal to the FD conference server that will direct the FD conference serve to take the FD client stations out of the listen-only mode with respect to the HD conference. To do so, the FD conference server may begin transmitting any bearer traffic that it receives from the FD client stations to the HD conference server. In addition, the FD conference server may optionally direct the FD client stations to enable bearer traffic transmission. Further, the FD conference server may transmit an alert signal (e.g., an in-band tone) to the FD client stations to inform each FD user of the switch out of listen-only mode.

With the FD client stations out of the listen-only mode with respect to the HD conference, bearer traffic will flow uni-directionally from the FD conference server to the HD conference server for transmission in turn to the HD client stations. Since the HD conference is half-duplex and since no HD client station currently holds the floor, there will be no bearer traffic to transmit from the HD conference server to the FD conference server, once again eliminating the floor control conflict for the HD conference server.

Accordingly, an exemplary embodiment of the invention may take the form of a conference system that includes at least a first conference server and a second conference server. In this embodiment, the first conference server is operable to communicatively link together a first plurality of client stations in a first conference and to control a floor of the first conference, and the second conference server is operable to communicatively link together a second plurality of client stations in a second conference and to exchange bearer traffic with the first conference server.

In this conference system, when any of the first plurality of client stations holds the floor, the second conference server restricts the second plurality of client stations to a listen-only mode with respect to the first conference, and bearer traffic flows uni-directionally from the first conference server to the second conference server for transmission in turn to the second plurality of client stations. On the other hand, when none of the first plurality of client stations holds the floor, bearer traffic flows uni-directionally from the second conference server to the first conference server for transmission in turn to the first plurality of client stations.

In another respect, an exemplary embodiment may similarly take the form of a conference system that includes at least a first conference server and a second conference server. The first conference server is operable to communicatively link together a first plurality of client stations in a first conference and to control a floor of the first conference, and the second conference server is operable to communicatively link together a second plurality of client stations in second conference, and further operable to exchange bearer and signaling traffic with the first conference server.

In this conference system, the first conference has a first state in which any of the first plurality of client stations holds the floor and a second state in which none of the first plurality of client stations holds the floor.

Upon transition of the first conference to the first state, the first conference server sends a first signal to the second conference server, and the second conference server responsively puts the second plurality of client stations in a listen-only mode with respect to the first conference, so that bearer traffic will then flow uni-directionally from the first conference server to the second conference server for transmission in turn to the second plurality of client stations.

Further, upon transition of the first conference to the second state, the first conference server sends a second signal to the second conference server, and the second conference server responsively takes the second plurality of client stations out of the listen-only mode with respect to the first conference, so that bearer traffic will then flow uni-directionally from the second conference server to the first conference server for transmission in turn to the first plurality of client stations.

In yet another respect, an exemplary embodiment of the invention may take the form of a method. The method may include (i) communicatively linking together a first plurality of client stations to define a first conference through a first conference server, and controlling a floor of the first conference, and (ii) exchanging bearer traffic of the first conference with a second conference server that communicatively links together a second plurality of client stations to define a second conference. In this method, the first conference has a first state in which any of the first plurality of client stations holds the floor, and the first conference has a second state in which none of the first plurality of client stations holds the floor.

The method may then include (iii) detecting transition of the first conference to the first state, and responsively sending a first signal from the first conference server to the second conference server to direct the second conference server to put the second plurality of client stations into a listen-only mode with respect to the first conference. When the second plurality of client stations are in the listen-only mode, bearer traffic of the first conference then flows uni-directionally from the first conference server to the second conference server for transmission in turn to the second plurality of client stations.

Still further, the method may include (iv) detecting transition of the first conference to the second state, and responsively sending a second signal from the first conference server to the second conference server to direct the second conference server to take the second plurality of client stations out of the listen-only mode. When the second plurality of client stations are not in the listen-only mode, bearer traffic of the first conference then flows uni-directionally from the second conference server to the first conference server for transmission in turn to the first plurality of client stations.

These as well as other aspects, advantages, and alternatives will become apparent to those of ordinary skill in the art by reading the following detailed description, with reference where appropriate to the accompanying drawings. Further, it should be understood that this summary and the description provided below are intended to describe the claimed invention by way of example only.

DETAILED DESCRIPTION

Figure 1:
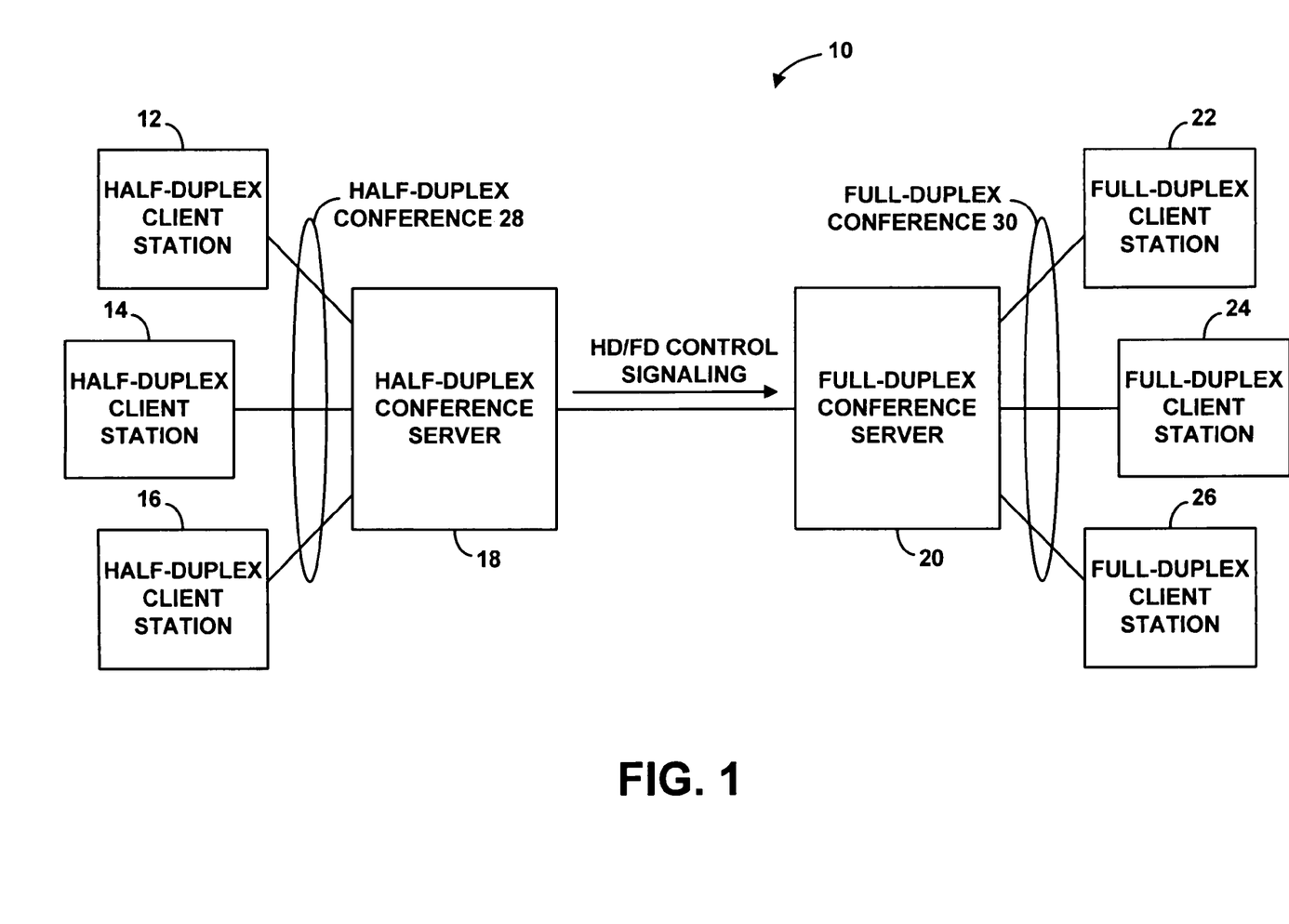
FIG. 1 is a block diagram of a half-duplex/full-duplex (HD/FD) conference system arranged in accordance with an exemplary embodiment of the invention.

Referring to the drawings, FIG. 1 is a generalized block diagram providing an overview of an exemplary HD/FD conferencing system 10 as presently contemplated. The exemplary conferencing system includes three HD client stations 12, 14, 16 served by an HD conference server ("HD server") 18, and three FD client stations 22, 24, 26 served by an FD conference server ("FD server") 20, with the HD server 18 being communicatively linked with the FD server 20.

It should be understood, of course, that more or fewer HD client stations and FD client stations could be involved, and more or fewer conference servers could be involved. Thus, the number of client stations and conference servers shown is merely illustrative and not limiting.

More generally, it should be understood that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

In the arrangement shown in FIG. 1, each of the HD client stations 12, 14, 16 could be a PTT client station (or more generally a PTX client station), such as a PTT-equipped cell phone for instance, or could be any other sort of client station equipped to engage in HD conferencing via HD server 18. By the same token, HD server 18 could be a PTT server or any other sort of conference server equipped to support HD conferencing by HD client stations. As such, HD client stations 12, 14, 16 and HD server 18 are preferably equipped to cooperatively set up and conduct an HD conference 28, and thus they support floor control such that HD server 18 allows only a single HD client station to have the floor at a time.

Each of the FD client stations 22, 24, 26 on the other hand, could be a client station such as a multimedia personal computer or VoIP telephone set, that is equipped to engage in FD conferencing via FD server 20. Further, FD server 20 could be a generalized conference bridge that is equipped to support FD conferencing by FD client stations. As such, FD client stations 22, 24, 26 and FD server 20 are preferably equipped to cooperatively set up and conduct an FD conference 30.

(In theory, a given client station could support both HD and FD operation; for purposes of this description, however, it will be assumed that each client station will be operating in just an HD mode or an FD mode. The same is the case with the HD and FD servers 18, 20. When a client station is operating in HD mode, it is an HD client station, and when a client station is operating in FD mode, it is an FD client station. Similarly, when a conference server is operating in an HD mode, it is an HD conference server, and when a conference server is operating in an FD mode, it is an FD conference server.)

In a preferred embodiment, the connections between the HD client stations, the HD server, the FD server, and the FD client stations will comprise packet-data connections, such as direct Ethernet or packet-switched network connections. In a specific embodiment, for instance, all of the connections may include a common packet-switched network, such as the Internet or a service provider's private packet-data network. Alternatively, separate connections can be provided. Further alternatively, some or all of the connections can be circuit-switched connections or can comprise any combination of circuit-switched and packet-switched connections.

In addition, the connection between each client station and its serving conference server, may include an access link that includes wireless and/or landline portions. For instance, if a client station is a cellular wireless device (such as a cell phone), the client station will likely communicate wirelessly with a cellular radio access network (RAN) operated by a wireless service provider, and the RAN may then provide connectivity with a packet-switched network on which the conference server resides. On the other hand, if a client station is a landline connected device such as a desktop personal computer, it may communicate with a landline access network, such as a local area network or the public switched telephone network (PSTN) for instance, and the landline access network may provide connectivity with a packet-switched network on which the conference server resides. Many other arrangements are possible as well.

As a general matter, the HD/FD conference system of FIG. 1 enables HD client stations 12, 14, 16 and FD client stations 22, 24, 26 to engage in an integrated conference together with each other. To facilitate this, HD server 18 and FD server 20 will exchange bearer traffic with each other, so as to integrate HD conference 28 and FD conference 30 into a combined HD/FD conference. As a result, when HD server 18 receives bearer traffic from one of the HD client stations, HD server 18 will transmit that bearer traffic (i) to each other HD client station and (ii) to FD server 20, and FD server 20 will transmit the traffic in turn to each of the FD client stations. Similarly, when FD server 20 receives bearer traffic from one or more of the FD client stations, FD server 20 will transmit that bearer traffic (i) to each other FD client station and (ii) to HD server 18, and HD server 18 will transmit the traffic in turn to each of the HD client stations.

In accordance with the exemplary embodiment, HD server 18 will further function as a core controller for the combined HD/FD conference, engaging in signaling with FD server 20 so as to harmonize the half-duplex operation of HD conference 28 and the full-duplex operation of FD conference 30. To do so, as HD server 18 controls the floor of HD conference 28, HD server 18 will keep track of a state of the HD conference 28 and, as the state changes, will send control signals to the FD server 20 to change the scope of participation of FD client stations 22, 24, 26 (or more generally the scope of participation of the FD conference itself) in the HD/FD conference.

Figure 2:
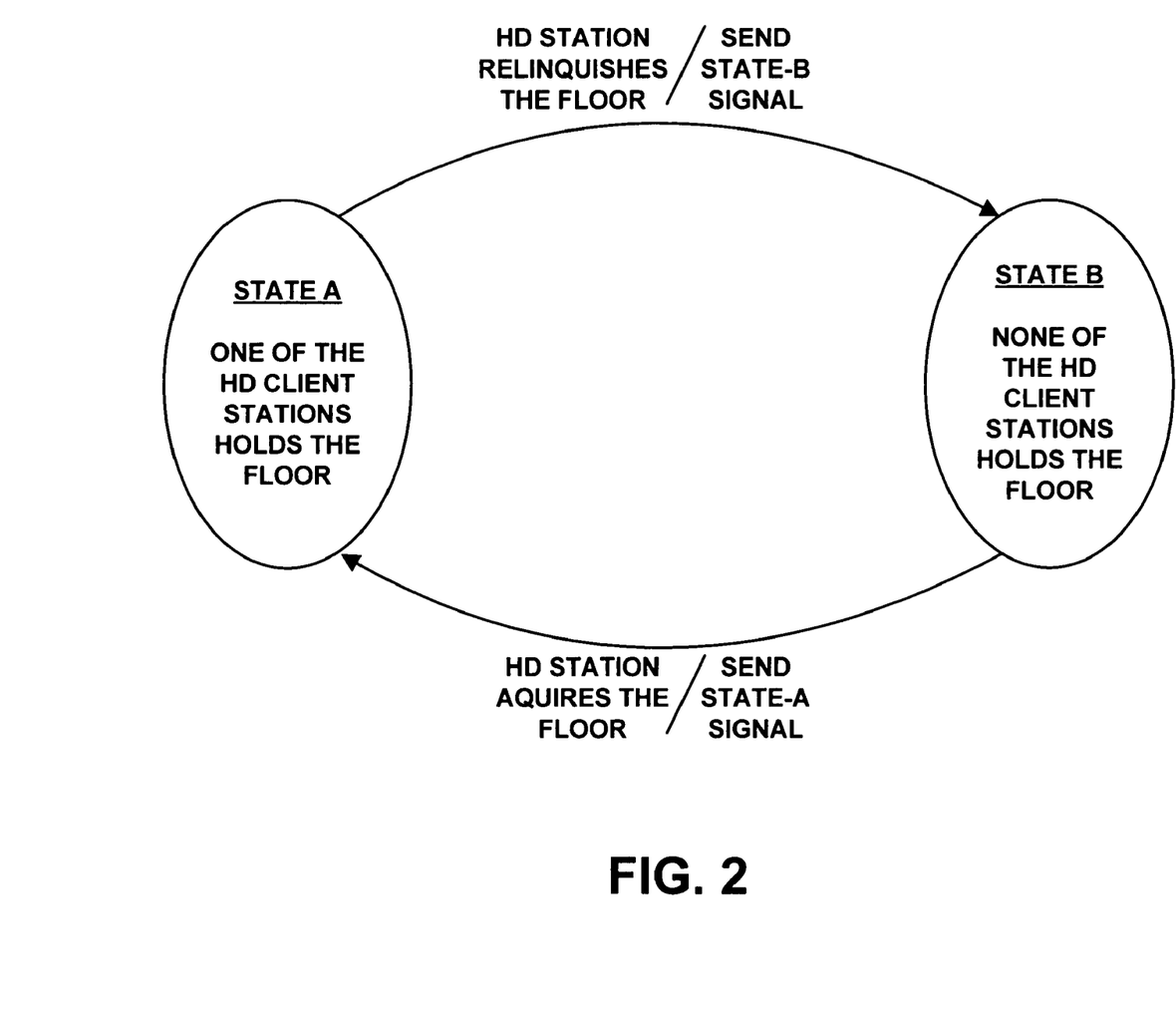
FIG. 2 is a state diagram defining logical state transitions and responsive actions carried out in accordance with the exemplary embodiment.

Preferably, HD server 18 will be programmed with a control logic that defines two states of the HD conference 28 and that specifies actions HD server 18 should take in response to transitions to those states. FIG. 2 is a state diagram depicting the preferred logic flow, which a processing unit of HD server 18 can be programmed to follow.

As shown in FIG. 2, the HD conference 28 has a first state, A, in which one of the HD client stations 12, 14, 16 holds the floor of the HD conference 28. An HD client station may acquire the floor by initiating the conference (and thus implicitly having the floor to start), by sending a successful floor-request signal to the HD conference as discussed above, or in some other manner. When an HD client station holds the floor, HD server 18 will be programmatically set to receive bearer traffic (if any) transmitted by that HD client station and to forward that bearer traffic to each other HD client station and to the FD server 20. The FD server 20 may then programmatically forward that bearer traffic to each of the FD client stations 22, 24, 26. Also in state A, HD server 18 is preferably set to disregard any bearer traffic transmitted from any HD client station that does not currently hold the floor.

Further, the HD conference 28 has a second state, B, in which none of the HD client stations 12, 14, 16 holds the floor of the HD conference 28. In this state, HD server 18 is not set to receive and forward bearer traffic from any of the HD client stations. Thus, if any of the HD client stations transmits bearer data, HD server 18 would preferably disregard the transmission. In state B, however, HD server is instead programmatically set to receive bearer traffic (if any) from FD server 20 (from FD conference 30) and to forward that bearer traffic to each HD client station 12, 14, 16. Thus, when one or more of the FD client stations 22, 24, 26 transmits bearer traffic to the FD server 20 in FD conference 30, FD server 20 preferably forwards that bearer traffic (e.g., combined together) to HD server 18, and HD server 18 forwards the bearer traffic in turn to each of the HD client stations 12, 14, 16.

In accordance with the exemplary embodiment, when HD conference 28 transitions to each of the illustrated states, HD server 18 will send a corresponding control signal to FD server to direct the FD server 20 to change the scope of participation of FD client stations 22, 24, 26 in the HD/FD conference.

In particular, when HD conference 28 transitions to state A (e.g., when an HD client station first initiates the conference, or upon transition from state B to state A), HD server 18 will send a STATE-A control signal to FD server 20, to which FD server 20 will programmatically respond by putting FD client stations 22, 24, 26 (or more generally FD conference 30) into a listen-only mode with respect to HD conference 28. Preferably, FD server 20 will put the FD client stations into a listen-only mode by ceasing transmission of bearer traffic from the FD client stations to the HD server 18 (with or without directing the FD client stations to also stop transmitting bearer traffic). Consequently, bearer traffic of the HD conference 28 will then flow to the HD server 18 from the HD client station that holds the floor, and then from the HD server 18 to the FD server 20 (and to each other HD client station), and from the FD server 20 to the FD client stations 22, 24, 26.

On the other hand, when HD conference 28 transitions to state B (e.g., when an HD client station that had the floor relinquishes the floor), HD server 18 will send a STATE-B control signal to FD server 20, to which FD server 20 will programmatically respond by removing the FD client stations from the listen-only mode. Preferably, FD server 20 will remove the FD client stations from listen-only mode by beginning to transmit any bearer traffic from the FD client stations to the HD server 18. Consequently, bearer traffic of the HD conference will then flow from the FD client stations 22, 24, 26 to the FD server 20, from the FD server 20 to the HD server 18, and from the HD server 18 to the HD client stations 12, 14, 16.

In addition, when the FD client stations are put into or taken out of the listen-only mode, the FD server 20 will preferably transmit to each FD client station an in-band alert signal to notify each FD user of the state change, so the user will know when to start or stop talking. In an audio conference, the in-band alert signal can be a predefined tone or combination of tones, or a descriptive speech announcement, for instance. The FD server 20 can programmatically generate and add this in-band alert to the bearer traffic (if any) it sends to the FD client stations (e.g., just before they enter the listen-only mode, or just after they exist the listen-only mode), in the same way the FD server 20 normally combines bearer traffic and transmits it. Alternatively, the HD server 18 can programmatically generate and add this in-band alert to the bearer traffic that it sends to the FD server 20, for transmission in turn from the FD server 20 to the FD client stations.

In accordance with the exemplary embodiment, any of a variety of well known protocols such as SIP, RTP, and RTCP, for instance, can be used to facilitate set up of the HD and FD conferences 28, 30, to facilitate floor control in the HD conference 28, and to facilitate control signaling between the HD and FD servers 18, 20.

SIP is the preferred protocol for use in setting up and connecting together the conferences in the first place. To facilitate this, each of the HD client stations 12, 14, 16 will preferably have a respective SIP address (e.g., sip:HD-client-12@company.com, etc.), and each of the FD client stations will preferably have a respective SIP address (e.g., sip:FD-client-22@company.com, etc.) Further, the HD server 18 will preferably have a server SIP address as well as a SIP address that it associates with the HD conference 28 (e.g., sip:HD-conference-28@realm.com), and the FD server 20 will preferably have a server SIP address as well as a SIP address that it associates with the FD conference 30 (e.g., sip:FD-conference-30@realm.com). Using these SIP addresses, the HD client stations may engage in SIP signaling with the HD server 18 to set up the HD conference 28, the FD client stations may engage in SIP signaling with the FD server 20 to set up the FD conference 30, and the HD server 18 may engage in SIP signaling with the FD server 20 to set up the connection between the HD conference 28 and the FD conference 30.

The particular mechanics of conference setup generally are not critical. As an example, various client stations can join a conference by themselves initiating SIP signaling to their conference server (e.g., calling into a conference, or initiating a conference). As another example, various client stations can join a conference by being invited by their conference server to join the conference.

As a particular example in the arrangement of FIG. 1, assume that FD client stations 22, 24, 26 have each been joined into FD conference 20 at a scheduled time (e.g., by each calling into the FD server 20, or by the FD server 20 inviting each to join). Thus, assume that each FD client station has a respective RTP leg with the FD server 20 and that FD server 20 programmatically bridges those legs together.

Assume next that HD client station 12 initiates the HD/FD conference, to be able to communicate with the other HD client stations 14, 16 and with the participants of the FD conference 30. To do so, upon user request (e.g., user invocation of PTT button), HD client station 12 may generate and send a SIP INVITE message to the SIP address of HD server 18, designating the other HD client stations 14, 16 and the FD conference 30, each by SIP address or in some other manner. HD server 18 may then responsively generate and send a SIP INVITE to the SIP address of each invited party, namely, to the SIP address of each other HD client station 14, 16, and to the SIP address of the FD conference 30 at FD server 20.

In response to each SIP INVITE from the HD server 18, each invited party will then accept the invitation by sending a SIP "200 OK" message to the HD server 18. In particular, HD client stations 14, 16 will each send a SIP 200 OK to the HD server 18, and FD server 20 will preferably send a SIP 200 OK for the FD conference 30 to the HD server 18. In turn, the HD server 18 will then send a SIP 200 OK to the initiating HD client station 12 to accept the invitation from the initiating HD client station 12.

To complete setup of an RTP conference leg between HD client station 12 and the HD server 18, HD client station 12 will then send a SIP "ACK" message to the HD server 18. And in turn, to complete setup of an RTP conference leg respectively between the HD server 18 and each invited party, the HD server 18 will send a SIP ACK to each invited party. In particular, the HD server 18 will send a SIP ACK respectively to HD client station 14 and HD client station 16, to complete setup of an RTP leg with each invited HD client station, and HD server 18 will send a SIP ACK to the FD server 20 to complete setup of an RTP leg between the HD server 18 and the FD server 20.

At this point, HD client station 12 will hold the floor, since it initiated the conference. Thus, HD server 18 would detect that the HD conference 28 is in state A, i.e., one of the HD client stations currently holds the floor. As a result, HD server 18 will send a STATE-A control signal to FD server as discussed above. One way for HD server to send this control signal is to include a predefined SIP header parameter in the conference setup signaling that it sends to FD server 20, such as in its SIP INVITE to the FD server. Another way is for the HD server to implicitly send the control signal by initiating the conference with FD server; that is FD server 20 can programmatically treat a conference invitation message from HD server to implicitly define a STATE-A control signal.

In any event, FD server 20 will programmatically detect the STATE-A control signal, and FD server 20 will programmatically put the FD client stations in a listen-only mode, by at least ceasing transmission of bearer traffic from the FD client stations to the HD server 18 as discussed above. Further, as noted above, FD server 20 may programmatically inject an in-band alert into bearer traffic that it sends to the FD client stations, to notify users of the FD client stations that they are entering into a listen-only mode with respect to the HD conference 28.

Assume next that HD client station 12 relinquishes the floor of the HD conference 28. To do so (e.g., when a user of HD client station 12 releases a PTT button), HD client station 12 may send to HD server 18 a SIP message that carries a predefined floor-relinquish header, and HD server 18 may respond affirmatively with a SIP 200 OK to HD client station 12. Alternatively, HD server may conclude that a floor timer has expired and may autonomously take the floor away from HD client station 12.

At this point, none of the HD client stations 12, 14, 16 hold the floor, and thus HD server 18 will detect that HD conference 28 has transitioned to state B. As a result, HD server 18 will send a STATE-B control signal to FD server 20. In accordance with the exemplary embodiment, HD server 18 can send this control signal to the FD server 20 as a predefined code within a SIP message header. Alternatively, HD server 18 can send the control signal to the FD server 20 as a predefined code in the payload block of an Application-defined (i.e., user-defined) RTCP packet (described at Section 6.6 of RFC 1889). Still alternatively, HD server 18 can send the control signal to the FD server 20 as a predefined code within an RTP header extension (also user-definable, described at Section 5.3.1 of RFC 1889).

In any event, FD server will programmatically detect the STATE-B control signal and will responsively take the FD client stations out of the listen-only mode. That is, FD server 20 will thus begin transmitting to the HD server 18 any bearer traffic coming from the FD client stations. Further, as noted above, FD server 20 may programmatically inject an in-band alert into bearer traffic that it sends to the FD client stations, to notify users of the FD client stations that they are now exiting the listen-only mode with respect to the HD conference 28.

In turn, assume that HD client station 14 seeks to acquire the floor of the HD conference 28, such as by sending a SIP-based floor-acquisition request message to HD server 18. Upon receipt of the floor request from HD client station 14, HD server 18 will preferably grant the floor-request, such as by sending a SIP 200 OK to HD client station 14. At this point, HD server 18 will detect that HD conference 28 has transitioned back to state A. As a result, HD server 18 will send a STATE-A control signal to FD server 20, e.g., in a SIP message, in an Application-defined RTCP packet, in an RTP header extension, or in some other manner. And FD server 20 will programmatically detect the STATE-A control signal and again put the FD client stations in a listen-only mode with respect to the HD conference 28. This process can repeat as appropriate.

Note that in an alternative arrangement, HD server 18 can condition grant of the floor to an HD client station on first receiving approval from FD server 20. In this regard, when HD server 18 receives a floor request message from an HD client station, HD server 18 can programmatically signal to FD server 20, and FD server 20 may then programmatically engage in signaling with the FD client stations, seeking approval for the floor transition. Upon receipt of an approval signal from at least one (or a programmatically-specified number or percentage) of the FD client stations, FD server 20 may then send an approval signal in response to the HD server 18, and the HD server 18 may then programmatically grant the HD client station's floor request. SIP, RTCP, or RTP signaling as described above can be used to carry this signaling communication between HD server 18 and FD server 20, and between FD server 20 and the various FD client stations.

Figure 3:
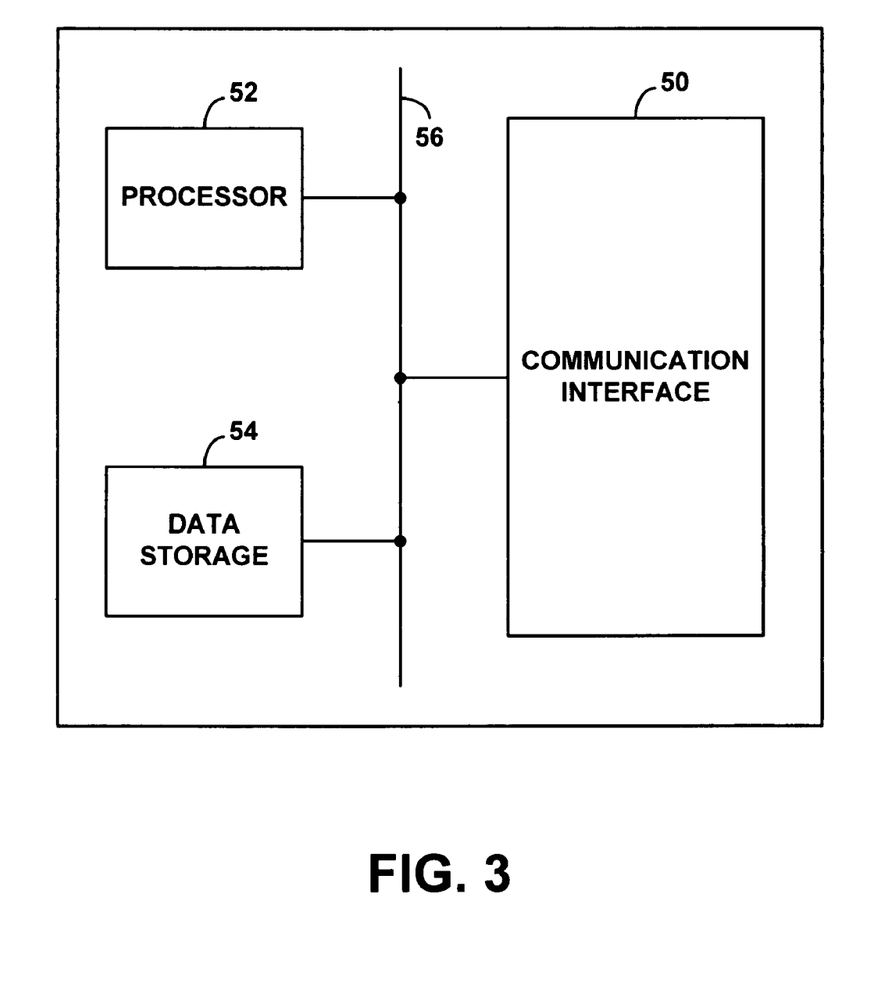
FIG. 3 is a block diagram of an conference server operable within the exemplary embodiment.

FIG. 3 is next a block diagram of an exemplary conference server, which can generally represent HD server 18 or FD server 20, illustrating functional components preferably contained in such a server. As shown, the exemplary conference server includes a communication interface segment 50, a processor 52, and data storage 54, all of which may be tied together by a system bus, network, or other mechanism 56.

Communication interface segment 50 may comprise a network communication interface, such as an Ethernet network interface module for instance, to facilitate communication over a packet-switched network with served client stations and with other conference servers. Alternatively, the communication interface can comprise a plurality of conference ports for connecting directly with circuits or networks tied to the various client stations and conference servers.

Processor 52 comprises one or more general purpose and/or special purpose processors (such as INTEL processors, and/or discrete digital signal processors). Data storage 54, in turn, comprises one or more volatile and/or non-volatile storage segments and can be integrated in whole or in part with processor 52. Data Storage 54 preferably contains program instructions executable by processor 52 to carry out the various conference server functions described herein. Thus, for instance, if the conference server is HD server 18, the program instructions would preferably be executable to manage HD conference set up and floor control, and to engage in the above-described control signaling with the FD server 20 so as to harmonize HD and FD conference operation. And if the conference server is FD server 20, the program instructions would preferably be executable to manage FD conference setup and to engage in the above-described control signaling with the HD server 18 and with the FD client stations, similarly to harmonize HD and FD conference operation.

Figure 4:
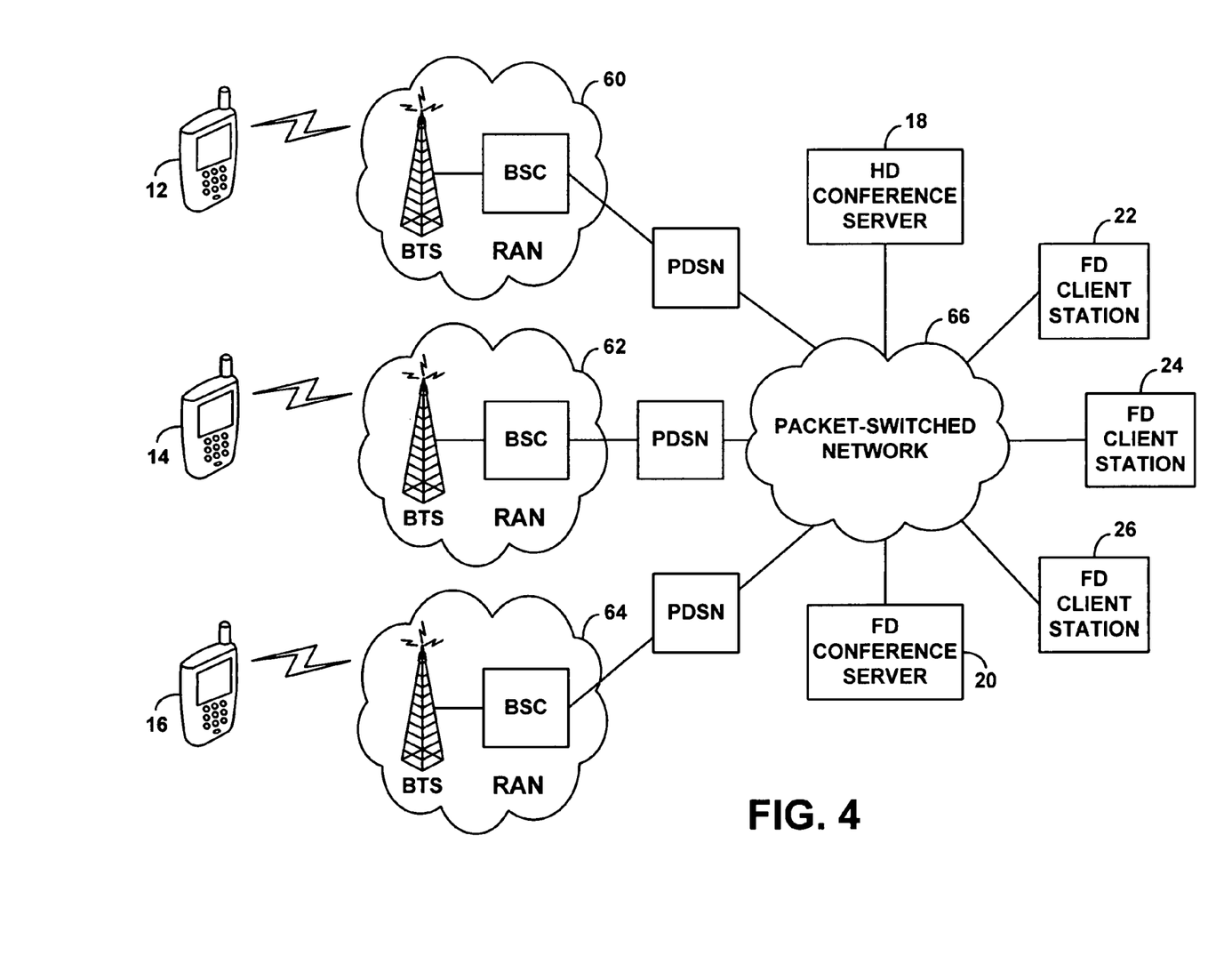
FIG. 4 is a block diagram of an HD/FD conference system including cellular wireless HD client stations in accordance with the exemplary embodiment.

Finally, FIG. 4 is a block diagram depicting in more detail how some or all of the client stations participating in the HD/FD conference can be cellular wireless devices, such as PTT handsets for instance. By way of example, FIG. 4 depicts each of the HD client stations 12, 14, 16 as being a cellular wireless device, with each being served by a respective RAN 60, 62, 64. (In an alternative embodiment, some or all of the devices can be served by a common RAN.) Each RAN contains a base transceiver station (BTS) that communicates over the air with served client stations. Each BTS is then coupled with a base station controller (BSC), and each BSC is in turn coupled with a packet data serving node (PDSN) that provides connectivity with a packet-switched network 66 (which can be a combination of networks) on which HD server 18, FD server 20, and FD client stations 22, 24, 26 reside (or through which they are accessible).

Using any well known wireless packet-data communication protocol, such as CDMA2000 for instance, each HD client station 12, 14, 16 can thus acquire wireless packet-data connectivity to be able to engage in packet-data communication with HD server 18 via packet-switched network 66. Further, FD client stations 22, 24, 26 can engage in packet-data communication with FD server 20 via packet-switched network 66. And HD server 18 and FD server 20 can engage in packet-data communication with each other via packet-switched network 66.

An exemplary embodiment of the present invention has been described above. Those skilled in the art will appreciate that changes from the embodiment described are possible within the scope of the invention, which is defined by the claims.

What is claimed is:

1. A conference system comprising:
   a first conference server operable to communicatively link together a first plurality of client stations in a first conference and to control a floor of the first conference;
   a second conference server operable to communicatively link together a second plurality of client stations in a second conference and to exchange bearer traffic with the first conference server via a packet switched connection,
   wherein, when any of the first plurality of client stations holds the floor, the second conference server restricts the second plurality of client stations to a listen-only mode with respect to the first conference, and bearer traffic flows uni-directionally from the first conference server to the second conference server for transmission in turn to the second plurality of client stations, and
   wherein, when none of the first plurality of client stations holds the floor, bearer traffic flows uni-directionally from the second conference server to the first conference server for transmission in turn to the first plurality of client stations,
   wherein each of the first plurality of client stations communicates with the first conference server via a respective packet-data link, and wherein each of the second plurality of client stations communicates with the second conference server via a respective packet-data link.

2. The conference system of claim 1, wherein the first conference server comprises a push-to-X conference server, the first conference comprises a push-to-X conference, and each of the first plurality of client stations comprises a cellular wireless device.

3. The conference system of claim 1, wherein the first conference server is a half-duplex conference server and the second conference server is a full-duplex conference server.

4. A conference system comprising:
   a first conference server operable to communicatively link together a first plurality of client stations in a first conference and to control a floor of the first conference; and
   a second conference server operable to communicatively link together a second plurality of client stations in a second conference, and further operable to exchange bearer and signaling traffic with the first conference server via a packet switched connection,
   wherein the first conference has a first state in which any of the first plurality of client stations holds the floor, and a second state in which none of the first plurality of client stations holds the floor,
   wherein, upon transition of the first conference to the first state, the first conference server sends a first signal to the second conference server, and the second conference server responsively puts the second plurality of client stations in a listen-only mode with respect to the first conference, so that bearer traffic will then flow uni-directionally from the first conference server to the second conference server for transmission in turn to the second plurality of client stations, and
   wherein, upon transition of the first conference to the second state, the first conference server sends a second signal to the second conference server, and the second conference server responsively takes the second plurality of client stations out of the listen-only mode with respect to the first conference, so that bearer traffic will then flow uni-directionally from the second conference server to the first conference server for transmission in turn to the first plurality of client stations, wherein each of the first plurality of client stations communicates with the first conference server via a respective packet-data link, and wherein each of the second plurality of client stations communicates with the second conference server via a respective packet-data link.

5. The conference system of claim 4, wherein the first conference server comprises a push-to-X conference server, the first conference comprises a push-to-X conference, and each of the first plurality of client stations comprises a cellular wireless device.

6. The conference system of claim 4, wherein the first conference server is a half-duplex conference server and the second conference server is a full-duplex conference server.

7. A method comprising:

communicatively linking together a first plurality of client stations to define a first conference through a first conference server, and controlling a floor of the first conference, wherein the first conference has a first state in which any of the first plurality of client stations holds the floor and a second state in which none of the first plurality of client stations holds the floor, and wherein each of the first plurality of client stations communicates with the first conference server via a respective packet-data link;

exchanging bearer traffic of the first conference with a second conference server via a packet-switched network connection, wherein the second conference server communicatively links together a second plurality of client stations to define a second conference, and wherein each of the second plurality of client stations communicates with the second conference server via a respective packet-data link; and detecting transition of the first conference to the first state, and responsively sending a first signal from the first conference server to the second conference server to direct the second conference server to put the second plurality of client stations into a listen-only mode with respect to the first conference, whereby, when the second plurality of client stations are in the listen-only mode, bearer traffic of the first conference flows uni-directionally from the first conference server to the second conference server for transmission in turn to the second plurality of client stations; and detecting transition of the first conference to the second state, and responsively sending a second signal from the first conference server to the second conference server to direct the second conference server to take the second plurality of client stations out of the listen-only mode, whereby, when the second plurality of client stations are not in the listen-only mode, bearer traffic of the first conference flows uni-directionally from the second conference server to the first conference server for transmission in turn to the first plurality of client stations.

8. The method of claim 7, wherein communicatively linking together the first plurality of client stations to define the first conference through the first conference server comprises:

providing for each client station of the first plurality of client stations a respective real-time packet-based media session with the first conference server; and at the first conference server, bridging together the respective real-time packet-based media sessions of the first plurality of client stations.

9. The method of claim 7, further comprising:

receiving the first signal at the second conference server, and responsively restricting the second plurality of client stations to the listen-only mode; and receiving the second signal at the second conference server, and responsively lifting the listen-only mode restriction.

10. The method of claim 7, wherein the first conference server comprises a push-to-X conference server, the first conference comprises a push-to-X conference, and each of the first plurality of client stations comprises a cellular wireless device.

11. The method of claim 7, wherein the first conference server is a half-duplex conference server and the second conference server is a full-duplex conference server.

12. The method of claim 7, wherein exchanging the bearer traffic via the packet-switched network connection comprises exchanging the bearer traffic via Real-time Transport Protocol (RTP) packet transmission.

13. The method of claim 7, further comprising:

providing, for receipt by the second plurality of client stations, a first in-band alert signal corresponding with the second plurality of client stations entering the listen-only mode; and providing, for receipt by the second plurality of client stations, a second in-band alert signal corresponding with the second plurality of client stations exiting the listen-only mode.

14. The method of claim 13, wherein:

providing the first in-band alert signal comprises the first conference server injecting the first in-band alert signal into bearer traffic that the first conference server sends to the second conference server for transmission in turn to the second plurality of client stations; and providing the second in-band alert signal comprises the first conference server injecting the second in-band alert signal into bearer traffic that the first conference server sends to the second conference server for transmission in turn to the second plurality of client stations.

15. The method of claim 13, wherein:

providing the first in-band alert signal comprises the second conference server injecting the first in-band alert signal into bearer traffic that the second conference server forwards from the first conference server to the second plurality of client stations; and providing the second in-band alert signal comprises the second conference server injecting the second in-band alert signal into bearer traffic that the second conference server forwards from the first conference server to the second plurality of client stations.

16. The method of claim 7, wherein controlling the floor of the first conference comprises:

receiving a floor-acquisition request from a given one of the first plurality of client stations, and responsively granting the floor to the given client station.

17. The method of claim 16, wherein controlling the floor of the first conference further comprises:

conditioning grant of the floor on receipt of an approval signal from the second conference server.

* * * * *